United States Patent [19]
Hafendorfer

[11] Patent Number: 5,413,364
[45] Date of Patent: May 9, 1995

[54] SULKY FOR SELF-PROPELLED LAWN MOWER

[76] Inventor: James T. Hafendorfer, 12202 Old Shelbyville Rd., Louisville, Ky. 40243

[21] Appl. No.: 156,379
[22] Filed: Nov. 22, 1993
[51] Int. Cl.⁶ .................. B62D 63/00; B60D 1/14; A01B 75/00
[52] U.S. Cl. ................... 280/32.7; 280/494; 280/493; 172/433
[58] Field of Search ........ 280/32.7, 447, 488, 280/489, 492, 493, 494; 172/433; 56/DIG. 9, DIG. 14, 15.6

[56] References Cited

U.S. PATENT DOCUMENTS

| | | | |
|---|---|---|---|
| 2,354,576 | 7/1944 | Clark | 280/32.7 X |
| 2,583,191 | 1/1952 | Voorhees | 280/494 |
| 2,664,300 | 12/1953 | Danielson et al. | 280/494 |
| 2,740,462 | 4/1956 | Stegeman | 280/32.7 |
| 3,190,672 | 6/1965 | Swanson et al. | 280/32.7 |
| 3,485,314 | 12/1969 | Herr | 280/32.7 X |
| 3,905,619 | 9/1975 | Sylvester | 280/494 X |
| 4,200,306 | 4/1980 | Helms | 280/494 |
| 4,711,461 | 12/1987 | Fromberg | 280/494 |
| 4,828,282 | 5/1989 | Pinto | 280/32.7 |
| 4,878,339 | 11/1989 | Marier et al. | 180/19.1 |
| 4,989,351 | 2/1991 | Shear | 280/32.7 X |
| 5,004,251 | 4/1991 | Velke et al. | 280/32.7 |
| 5,118,123 | 6/1992 | Betrock | 280/32.7 |
| 5,186,483 | 2/1993 | Sheppard | 280/494 |

FOREIGN PATENT DOCUMENTS 1345770 10/1962 France ................. 280/494

Primary Examiner—Mitchell J. Hill
Assistant Examiner—F. Zeender
Attorney, Agent, or Firm—Scott R. Cox

[57] ABSTRACT

A sulky for transportation of an operator attachable to self-propelled equipment comprised of a first pivot element attached to the self-propelled equipment, a first arm with first and second ends wherein said first end is pivotally connected to said first pivot element, a second pivot element pivotally connected to said second end of said first arm, a second arm with first and second ends wherein said first end of said second arm is pivotally connected to said second pivot element, a third pivot element pivotally connected to said second end of said second arm and a standing operator platform pivotally connected to the third pivot element.

16 Claims, 6 Drawing Sheets

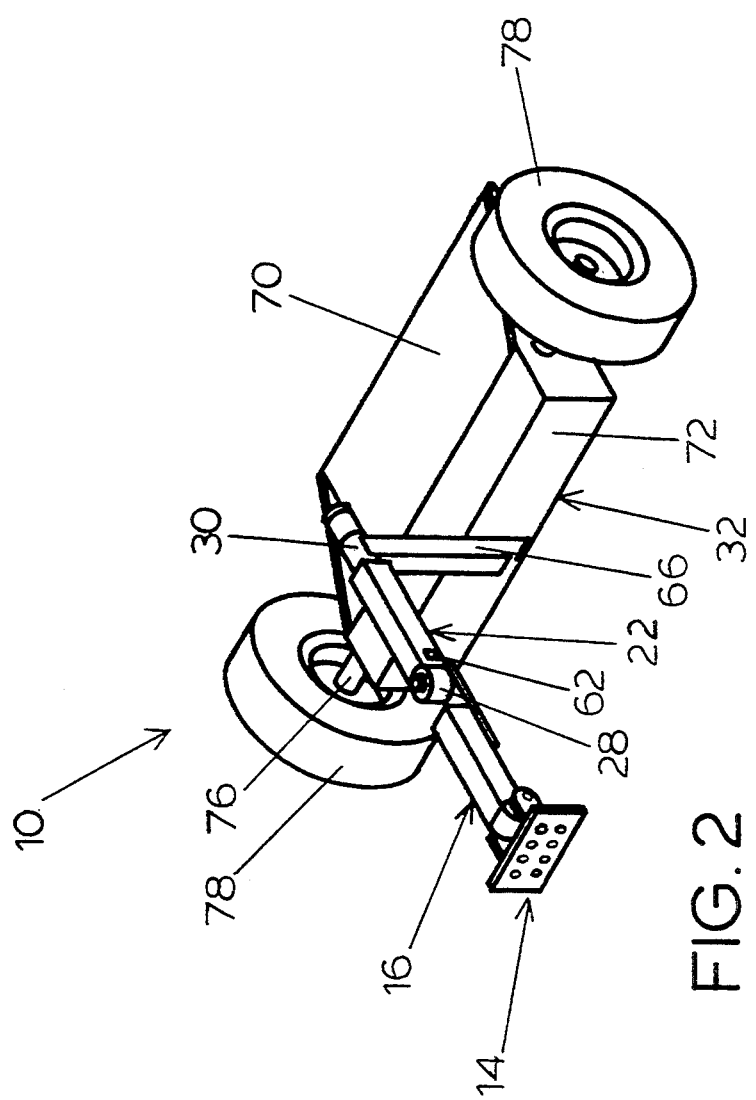

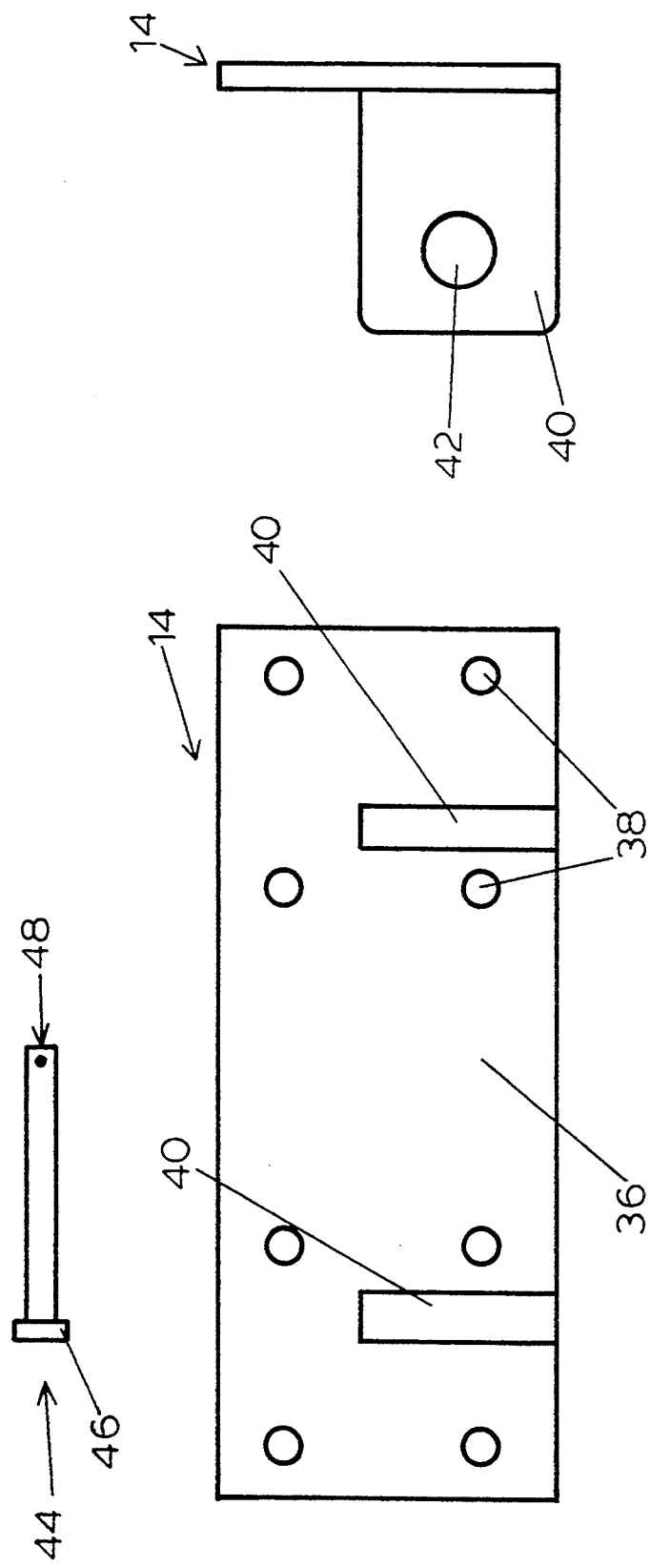

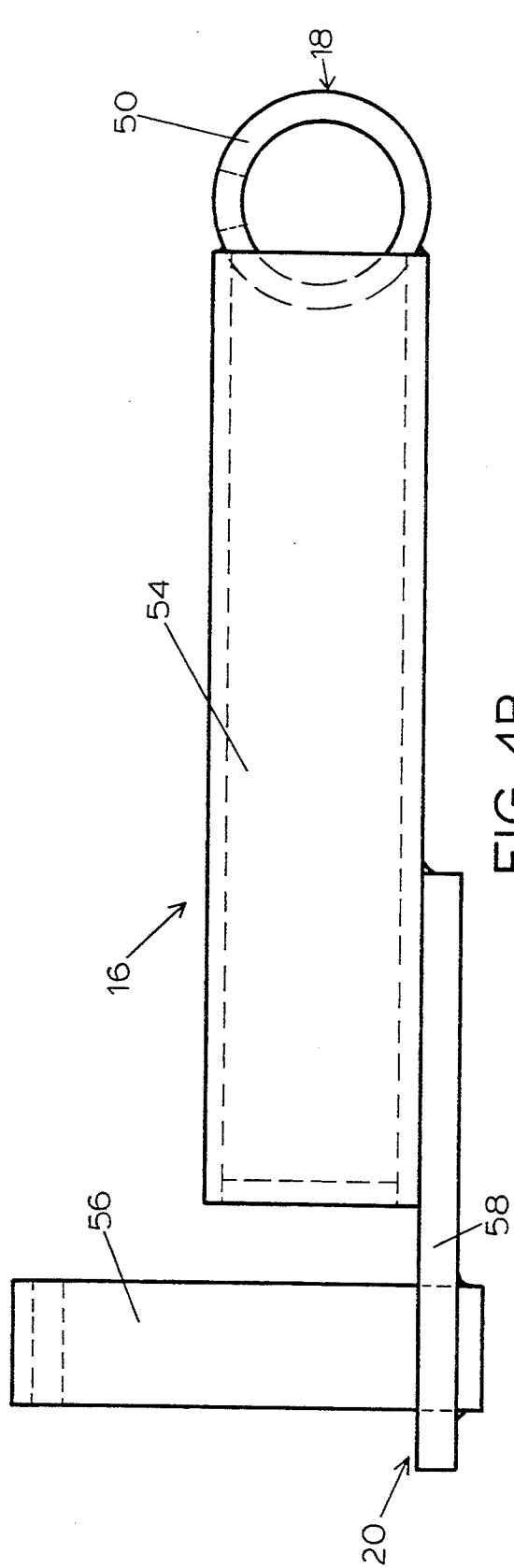
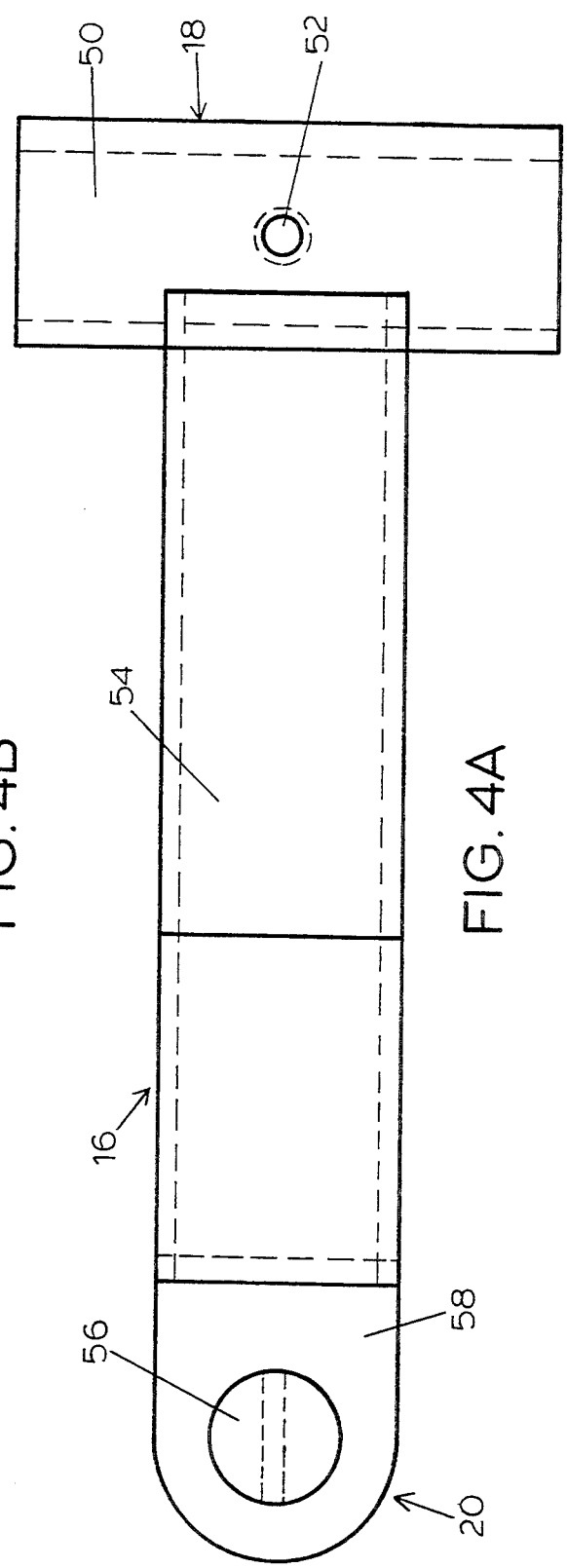
FIG. 4B
FIG. 4A

SULKY FOR SELF-PROPELLED LAWN MOWER

BACKGROUND OF THE INVENTION

1. Field of Invention

This invention relates to devices used with lawn mowing equipment. More specifically, this invention discloses an improved sulky apparatus attachable to a self-propelled lawn mower.

2. Prior Art

Commercial lawn maintenance organizations increasingly use self-propelled, walk behind lawn mowers. These self-propelled mowers typically are steered through two rear wheels by operating separate hand controlled levers on each side of the handle arms. Each of the rear wheels are individually braked and clutched to create the steering effect. These self-propelled lawn mowers are relatively simple to operate and relatively inexpensive to purchase and maintain compared to riding lawn mowers. In addition, these lawn mowers are quite useful in mowing steep hills. Further, they will normally fit more easily in trucks for storage and transportation.

As a result of the increase in the size of the engines installed in these self-propelled lawn mowers, mowing speeds have increased significantly. Although larger areas can be cut in shorter times by these improved lawn mowers, the increased speed is a disadvantage to the operator who is required to walk behind these mowers at a quick pace for long periods of time, sometimes upwards of 8 to 10 hours a day.

More and more frequently, riding attachments or sulkies for use by the operation of these self-propelled lawn mowers have been attached to these mowers to reduce the amount of walking necessary for the operator. While these sulkies reduce the amount of time the operator is required to walk behind the mowers, the currently existing sulkies have not provided entirely satisfactory results under all conditions. Further, some of these attachments may be dangerous under certain operating conditions such as when the mower is backed up.

A number of sulky apparatus have been disclosed, for example, the device shown in U.S. Pat. No. 5,004,251. This sulky has a horizontal pivot element which allows the operator standing platform to rotate completely around the pivot element. A caddie for transporting a lawn mower operator with a rigid axle assembly for connecting the wheels of the caddy to the mower body is disclosed in U.S. Pat. No. 4,828,282. An optional standing or sitting lawn mower trailer also with the rigid axle is disclosed in U.S. Pat. No. 5,118,123. See also, U.S. Pat. No. 2,354,576. A power lawn mower with deployable riding platform is disclosed in U.S. Pat. No. 4,878,339. Other types of trailers designed to be pulled behind other types of powered equipment, where the operator may stand on the trailer, are disclosed in U.S. Pat. Nos. 4,989,351 and 3,485,314.

While these sulky-type devices for self-propelled power equipment satisfy some of the concerns of operators of this equipment, there are still certain problems unresolved by these devices. For example, problems may occur in operation over uneven ground because of the inflexibility of the axle running from the mower to the platform. Further, the equipment may not be reliable because of the wear associated with this equipment. Further, safety concerns may be present when the self-propelled mowers are operated in reverse. In addition, the devices frequently are not helpful in keeping the mower well positioned for the best grass cutting characteristics.

Therefore, it is an object of this invention to provide a sulky device attachable to a self-propelled mower.

It is another object of this invention to provide a new and improved sulky apparatus attachable to a self-propelled mower which can be utilized over uneven ground.

It is a still further object of this invention to provide a sulky apparatus for attachment to a self-propelled mower where the platform for the operator pivots for safe use over uneven ground.

It is a still further object of this invention to provide a sulky for attachment to a self-propelled mower which is safe to operate even when the self-propelled mower is operated in reverse.

It is a still further object of this invention to provide a sulky for attachment to a self-propelled mower which assists in keeping the front end of the mower from bouncing when in use.

These and other objects and features of the present invention will become apparent to those skilled in the art from a consideration of the following detailed description, drawings and claims. The description along with the accompanying drawings provides a selected example of construction of the device to illustrate the invention.

SUMMARY OF THE INVENTION

In accordance with the present invention there is provided a sulky attachable to self-propelled equipment for transportation of an operator comprising a pivotal attachment element for attachment of the remaining elements of the sulky to the powered equipment, a first arm with first and second ends with the first end pivotally connected to the pivotal attachment element, a vertical pivot connector pivotally connected to the second end of the first arm, a second arm with first and second ends wherein the first end of the second arm is pivotally connected to the vertical pivot connector, a horizontal pivot connector pivotally connected to the second end of the second arm and a standing operator platform pivotally connected to the horizontal pivot connector, wherein the standing operator platform contains one or more wheels rotatably secured thereto.

BRIEF DESCRIPTION OF THE DRAWINGS

This invention will now be described with reference to the accompanying drawings in which

FIG. 2 is a top perspective view of the sulky.

FIG. 3A is a front view of the pivotal attachment element.

FIG. 3B is a side view of the pivotal attachment element.

FIG. 4A is a top view of the first arm of the sulky.

FIG. 4B is a side view of the first arm of the sulky.

DETAILED DESCRIPTION OF THE PREFERRED EMBODIMENTS

Figure 1:
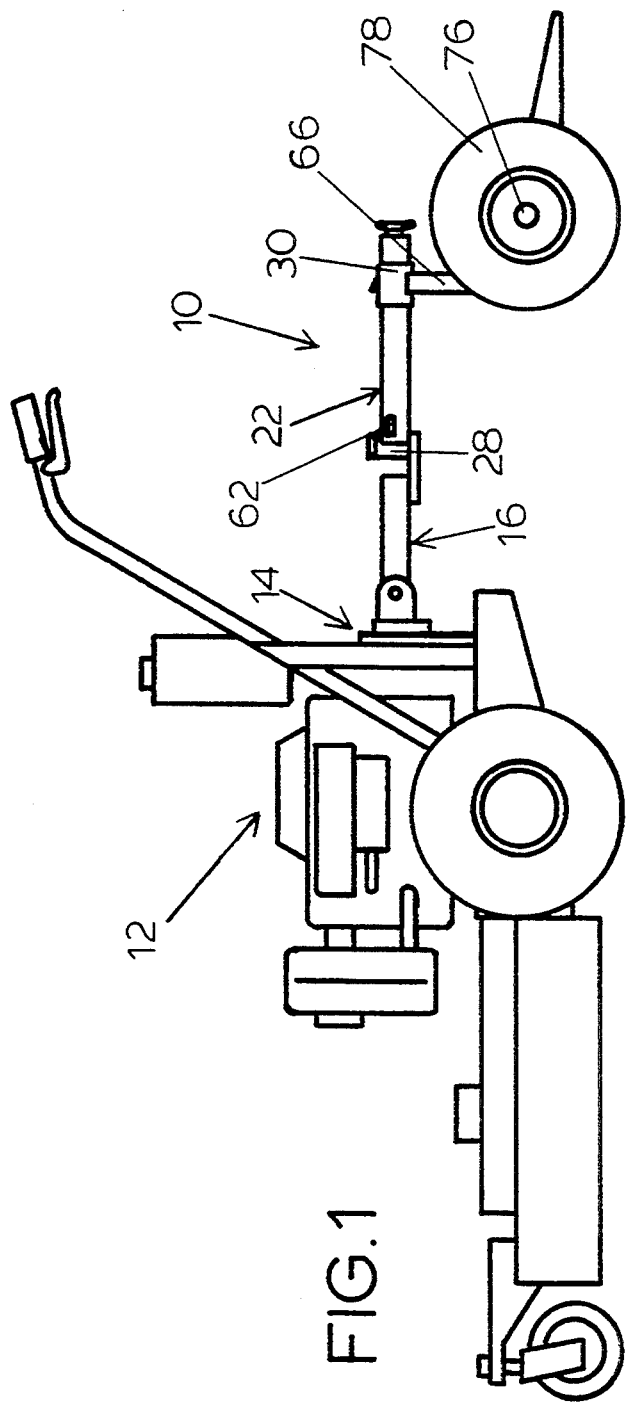
FIG. 1 is a side view of the sulky for attachment to self-propelled equipment.

Although the invention is adaptable to a wide variety of uses it is shown in the drawings for purpose of illustration as embodied in a sulky (10) for powered equipment (12) comprised of a pivotal attachment element (14) secured to the back of the powered equipment, a first arm (16) with first (18) and second (16) ends, a second arm (22) with a first (24) and second (26) arm containing a vertical pivot connector (28) at its first end (24), a horizontal pivot connector (30) and a standing operator platform (32). See FIGS. 1 and 2.

The pivotal attachment element (14) is mounted to the back surface (34) of the power equipment (12) either on its vertical surface or on its horizontal surface adjacent to the rear edge of the powered equipment. See FIGS. 3A and 3B. The pivotal attachment element is designed to attach the remaining elements of the sulky to the back of the powered equipment (12). While a number of attachment apparatus could be used, preferably, the pivotal attachment element (14) is comprised of a generally flat plate (36) containing a number of openings (38) through which the pivotal attachment element is secured to the surface of the powered equipment by belts, screws or pins. Extending parallel from the surface of the flat plate (and away from the surface of the powered equipment) are a pair of arms (40), approximately 2 to about 8 inches or more in length and approximately 2 to about 6 inches apart. Near the outer end of each of these arms is an opening (42) through which a pivot pin (44) can be inserted. The pivot pin (44) is preferably a pin of sufficient length to pass through the openings (42) in the arms (40) of the pivotal attachment element (14). One end of the pivot pin (44) preferably has a head (46) secured thereto to prevent its further passage through the openings (42) and the second end (48) contains a hole passing through the pivot pin through which an attachment means can be inserted to hold the pivot pin in place. A Cotter pin, Hair pin, washer, nut and bolt or other attachment means can be used to secure the pivot pin (44) in place through these openings. The pivot pin (44) is designed to secure the remaining elements of the sulky to the back of the powered equipment.

The first arm (16), containing a first (18) and second end (20), is positioned with the first end (18) of said first arm (16) connectable to the pivotal attachment element (14). See FIGS. 4A and 4B. The first end (18) of the first arm (16) is comprised of a pivot tubing element (50) which will permit the first arm (18) to rotate about the pivot pin (44) of the pivotal attachment element (14). Preferably, this pivot tubing element (50) is from about 2 to about 8 inches in length, circular in cross-section with an opening passing throughout slightly larger than the pivot pin (44). This pivot tubing element (50) preferably contains fittings or bushings, preferably bronze bushings, to allow the first arm (16) to easily rotate about the pivot pin (44). In addition, a zerk fitting (52) is also preferably an element of the pivot tubing element (50) (and to all other rotating or pivoting elements) for lubrication purposes.

Secured to a side of this pivot tubing element (50) is a first arm extender (54), which is preferably 3 to 10 inches in length, which runs between the pivot tubing element (50) of the first arm (16) and the second end (20) of the first arm (16). This first arm extender (54) is preferably a hollow tubing section having a circular, square, or rectangular cross-section, preferably square, which is secured to the pivot tubing element (50) by any conventional securing means such as by welding it in place. High torsional strength of each of these tubing elements of the sulky (10) is required because of stress placed on these elements when in operation.

The second end (20) of the first arm (16) is connected to the first arm extender (54) and consists of a vertical shaft (56) onto which the vertical pivot connector (28) is secured. The vertical shaft (56) is secured to a flattened metal strip (58) which is itself secured to the first arm extender (54) by any conventional means such as by bolts or welding. Alternatively, the flattened metal strip (58) can merely be an extension of a lower section of the first arm extender (54). The vertical shaft (56) can be any conventional metal tubular shaft with a circular cross-section secured to the flattened metal strip (58) by any conventional securing means such as by welding or by bolting it in place. Preferably an opening is provided through the vertical shaft (56) near the top of the vertical shaft to allow a securing means such as a cotter pin to be inserted through the vertical shaft (56) to hold the vertical pivot connector (28) of the second arm in place but not so tightly held as to prevent the free rotation of the vertical pivot connector (28) about the vertical shaft (56).

The vertical pivot connector (28) is similar in construction to the pivot tubing element (50) of the first arm (16). This vertical pivot connector (28) is preferably about one to about four inches in length. This vertical pivot connector (28) permits rotation of the second arm (22) around the vertical shaft (56) of the first arm (16) which is secured to the second end (20) of the first arm (16). The vertical pivot connector (28) is generally circular in cross-section and tubular with appropriate bearings and/or bushings contained within to permit the free rotation of the vertical pivot connector (28) around the vertical shaft (56).

Figure 5B:
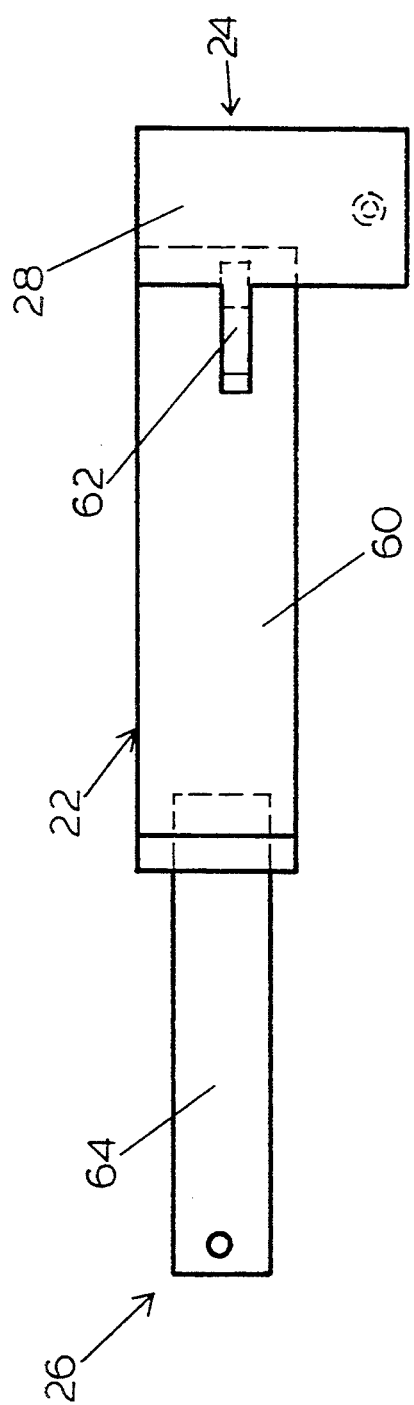
FIG. 5B is a side view of the second arm of the sulky.
Figure 5A:
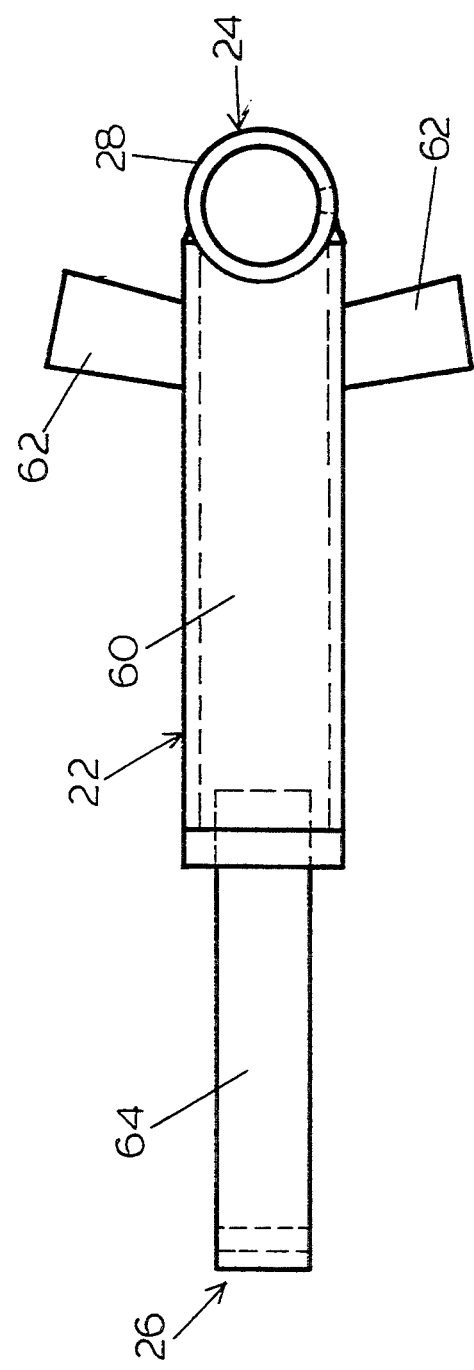
FIG. 5A is a top view of the second arm of the sulky.

The second arm (22) is connected to the vertical pivot connector (28) by conventional securing methods such as by welding and is comprised of a second arm extender (60), stop elements (62) and a horizontal shaft (64). See FIGS. 5A and 5B. The second arm extender (60) of the second arm (22) is similar in construction to the first arm extender (54) of the first arm (16) and can have a circular, rectangular or square cross-section, preferably a square cross-section. Connected to each side of the second arm extender (60) of the second arm and extending outwardly therefrom are the stop elements (62). As the second arm (22) rotates about the vertical pivot connector (28), the stop elements (62) prevent the second arm (22) from rotating past the first arm (16) and provide a safety feature for the device when the powered equipment (12) is being operated in reverse. For the stop elements (62) to be effective, the second arm extender (60) must rotate in a plane approximately the same as the first arm (16). This is assured by the vertical shaft (56) being attached to the flattened metal strip (58) which extends from the bottom portion of the first arm extender (54) operating in conjunction with the vertical pivot connector (28) such that the first arm (16) and the second arm (22) operate within the same plane. Attached to the second arm extender (60) is the horizontal shaft (64). This horizontal shaft (64) is preferably circular in cross-section and can vary in length from about 2 to about 8 inches or more, depending upon the needs of the operator. It is similar in design to the vertical shaft (56) of the first arm (16). The horizontal pivot connector (30) is placed over this horizontal shaft (64) of the second arm (22) to allow free rotation of the horizontal pivot connector (30) about this horizontal shaft (64).

The horizontal pivot connector is held (30) in place on the horizontal shaft (64) by any conventional means such as a hair pin or a cotter pin. Washers or other types of extenders may be placed on the horizontal shaft (64) to extend the horizontal pivot connector (30) away from the second arm (22) for a longer sulky.

The horizontal pivot connector (30) is similar in design to the vertical pivot connector (28) and is designed to permit its free rotation about the horizontal shaft (64). An appropriate zerk fitting is preferably an element of the horizontal pivot connector (30). Secured to the bottom side of the horizontal pivot connector (30) is the standing apparatus platform (32).

Figure 6:
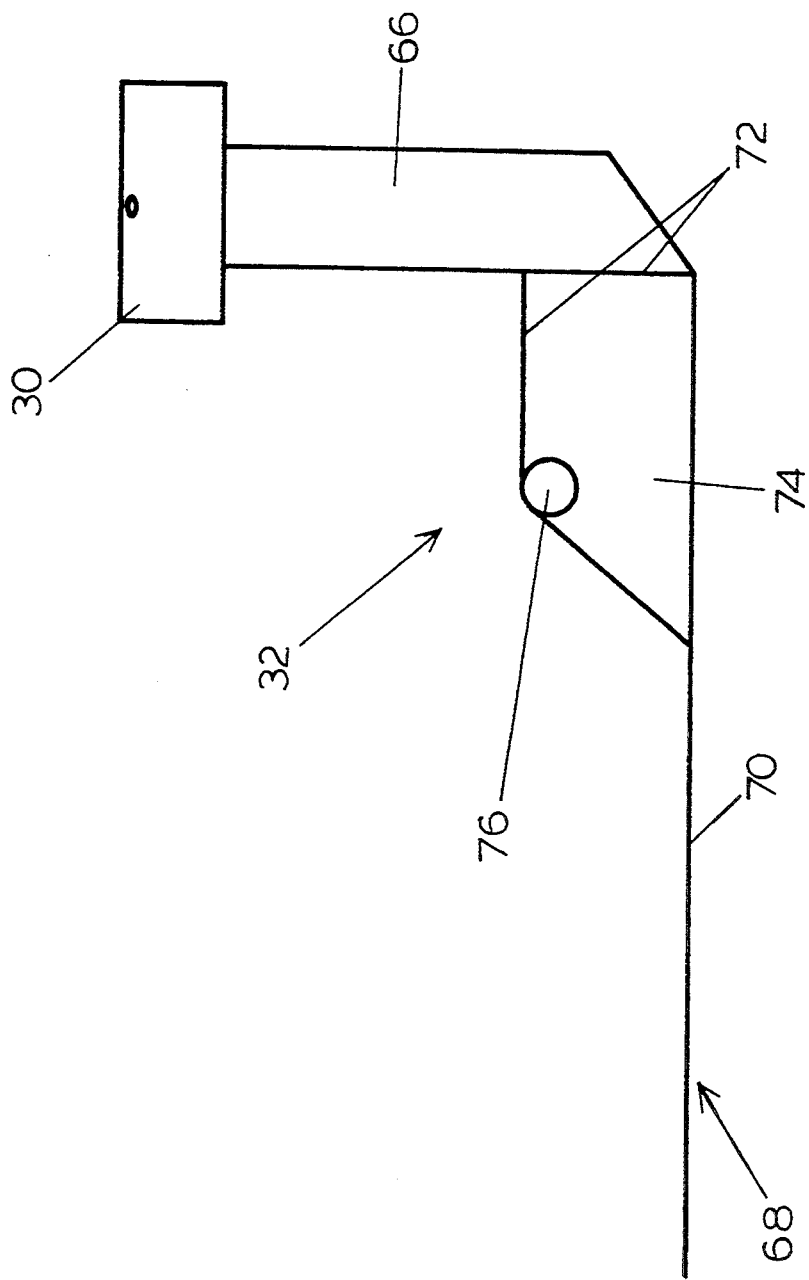
FIG. 6 is a side view of the standing operator platform of the sulky without wheels.

The standing apparatus platform (32) is generally comprised of a platform tubing element (66), extending downward from the horizontal pivot connector (30), onto which is secured the foot supporting element (68). See FIG. 6. The platform tubing element (66) is similar to the first (54) and second arm (60) extenders of the first (16) and second (22) arm. Its length is dependent upon the location of the pivotal attachment element (14) on the powered equipment (12) and the size and height of the powered equipment. It is preferably circular, rectangular or square in cross-section, preferably square, to provide sufficient surface area for connecting the foot supporting element (68) to the platform tubing element (66). This attachment is done by conventional means such as by welding or by bolting in place.

The foot supporting element (68) is comprised of a platform flattened piece (70), onto which the operator stands, a toe guard (72) running the length of the platform flattened piece (70) and extending upward from the flattened piece (70), axle supporting elements (74) secured to the side of the flattened piece (70), also extending upward, an axle (76) or pair of axles secured to the axle supporting elements (74) and a pair of wheels (78) secured on the axle. See FIG. 6.

The platform flattened piece (70) is a generally flat perforated metal sheet with a punched, raised tread onto which the operator can stand. It should be manufactured from sufficiently strong material to support the weight of the operator and also to permit the sulky to be operated for an extended period of time over uneven ground. Running the length of the front of the platform flattened piece (70) is the toe guard (72) which is a vertical metal piece secured to the end of the platform flattened piece (70) which operates to prevent the operator's feet from extending beyond the front of the standing operator platform (32). If desired, the toe guard (72) can also extend backward from the front of the standing operator platform to shield the top of the toes of the operator from the rotation of the axle. Attached at the sides of the platform flattened piece (70) and at the ends of the toe guard (72) are the axle supporting elements (74) which are generally flattened metal sheets extending upward from the platform flattened piece (70) and rearward from the toe guard (72) which contain openings containing conventional bearings or bushings through which the axle (76) will pass. The axle (76) is a conventional axle which is commonly used with sulkies of this type. A continuous axle running the width of the platform flattened piece (70) or a pair of axles, one secured to each of the axle supporting elements (74) can be used. While one or a pair of wheels (78) may be used, preferably two wheels are used which are attached to the ends of the axle by a conventional securing means such as cotter or hair pin to allow the free rotation of the wheels (78) about the axle (76) without the wheels coming off the axle.

The platform flattened piece (70) is preferably located at a specified location on the standing operator platform (32) in relation to the axle (76) so that a significant portion of the weight of the operator is directed toward the rear of the platform flattened piece (70) behind the axle (76). By this location, force is directed downward onto the portion of the standing operator platform behind the axles. This action consequentially torques upward the first (16) and second (22) arms of the sulky. This torque will be transferred to the powered equipment (12) to assist in keeping the front wheels of the powered equipment down even over bumpy terrain. Preferably, at least two-thirds of the length of the platform flattened piece (70) is located behind the axle (76) to assist in the generation of this torque.

In operation, the pivotal attachment element (14) is secured to the back of the powered equipment (12), preferably on its back edge, at such a location as to allow the first arm (16) to rotate around the pivot pin (44) used with the arms (40) of the pivotal attachment element (14). The first arm (16) is then secured in place to the pivotal attachment element (14), securing the attachment of the sulky (10) to the powered equipment (12). As the powered equipment operates, the pivot tubing element (50) of the first arm (16) pivots in relation to the pivotal attachment element (14) to allow rotation of the first arm (16) around the pivot pin (44) of the pivotal attachment element (14), providing a smoother ride. As the powered equipment turns, the cooperative arrangement of the vertical pivot connector (28) and the vertical shaft (56) permit the controlled rotation of the sulky (10). As the sulky (10) is ridden on uneven ground or where there is a tilt to the ground, the horizontal pivot connector (30) permits the standing operator platform (32) to rotate about the horizontal shaft (64) and thus remain securely on the ground, thus providing more safety for the operator. Stop elements (62) located on the second arm (22) prevent the standing operator platform (32) rotating completely about its axis. In addition, by allowing rotation of the standing operator platform (32) about the horizontal pivot connector (30), less stress is placed on the first (16) and second (20) arms of the sulky. Further, by the location of a majority of the platform flattened piece (70) of the foot support element (68) behind the axle (76) or axles, positive torque is placed on both the first (16) and second (22) arm to assist in keeping of the powered equipment (12) on the ground even over rough terrain.

I claim:

1. A sulky for transportation of an operator, attachable to self-propelled powered equipment comprising
    (a) a first pivot means attached to the powered equipment,
    (b) a first arm with first and second ends wherein said first end of said first arm is pivotally connected to said first pivot means wherein the first arm comprises a pivot tubing element, a tubular element and a vertical shaft attached at the second end of the first arm,
    (c) a second pivot means pivotally connected to said second end of said first arm wherein the second pivot means is a vertical tubing element which can freely rotate about the vertical shaft of the second end of the first arm, (d) a second arm with first and second ends wherein said first end of said second arm is connected to said second pivot means, (e) a third pivot means pivotally connected to said second end of said second arm, and (f) a standing operator platform connected to the third pivot means.

2. The sulky of claim 1 wherein the standing operator platform is comprised of a vertical bar secured to the third pivot means, a foot supporting element and a pair of wheels secured to the foot supporting element.

3. The sulky of claim 1 wherein the first pivot means is comprised of a plate secured to the powered equipment, a pair of arms extending from said plate and a pivot pin passing through an opening in an end of each of the arms extending from said plate.

4. The sulky of claim 1 wherein the second arm is comprised of a tubing element extending from said second pivot means and secured to the second end of the second arm is a horizontal pivot connector.

5. The sulky of claim 4 wherein stop arms are secured to the tubing element to prevent the second arm from rotating past the first arm.

6. The sulky of claim 4 wherein an extender means for extending the sulky is secured to said horizontal pivot connector.

7. The sulky of claim 4 wherein the third pivot means is a tubular element which is rotatably secured to the horizontal pivot connector.

8. The sulky of claim 2 wherein the foot supporting element is comprised of a platform flattened piece, a toe guard, an axle supporting element, an axle and a wheel means, wherein said axle has a front portion and a back portion.

9. The sulky of claim 8 wherein at least two-thirds of the weight of the platform flattened piece is located behind the axle.

10. A sulky for transportation of an operator, attachable to a self-propelled, powered equipment comprising:

(a) a first pivot means comprised of a plate secured to the powered equipment, a pair of arms extending from said plate and a pivot pin passing through an opening in an end of each of the arms;

(b) a first arm with first and second ends wherein said first end of said first arm is pivotally connected to said pivot pin of said first pivot means wherein the first arm comprises a pivot tubing element, a tubular element and a vertical shaft attached at the second end of the first arm;

(c) a second pivot means pivotally connected to said second end of said first arm wherein the second pivot means is a vertical tubing element which can freely rotate about the vertical shaft of the second end of the first arm;

(d) a second arm with first and second ends wherein said first end of said second arm is connected to said second pivot means;

(e) a third pivot means comprised of a tubular element which is rotatably secured to the second arm; and (f) a standing operator platform connected to said third pivot means comprised of a vertical bar secured to the third pivot means, a foot supporting element and a pair of wheels secured to the foot supporting element.

11. The sulky of claim 10 wherein the second arm is comprised of a tubing element extending from said second pivot means and secured to the second end of the second arm is a horizontal pivot connector.

12. The sulky of claim 11 wherein stop arms are secured to the tubing element to prevent the second arm from rotating past the first arm.

13. The sulky of claim 11 wherein an extender means is secured to said horizontal pivot connector.

14. The sulky of claim 11 wherein the third pivot means is a tubular element which is rotatably secured to the horizontal pivot connector.

15. The sulky of claim 10 wherein the foot supporting element is comprised of a platform flattened piece, a toe guard, an axle supporting element, an axle and a pair of wheels wherein said axle has a front portion and a back portion.

16. The sulky of claim 15 wherein at least two-thirds of the weight of the platform flattened piece is located behind the axle.

* * * * *